United States Patent
Danelli et al.

(10) Patent No.: US 10,253,912 B2
(45) Date of Patent: Apr. 9, 2019

(54) MULTI-COUPLING DEVICE FOR THE MULTIPLE QUICK COUPLING OF MULTIPLE HYDRAULIC, ELECTRICAL AND/OR PNEUMATIC LINES, WITH THE POSSIBILITY OF INDIVIDUAL MANUAL COUPLINGS

(71) Applicant: FASTER S.P.A., Rivolta D'adda (IT)

(72) Inventors: Alessandro Danelli, Brignano Gera D'adda (IT); Roberto Sorbi, Rivolta D'adda (IT)

(73) Assignee: FASTER S.P.A., Rivolta D'adda (IT)

( * ) Notice: Subject to any disclaimer, the term of this patent is extended or adjusted under 35 U.S.C. 154(b) by 296 days.

(21) Appl. No.: 15/102,388

(22) PCT Filed: Dec. 10, 2014

(86) PCT No.: PCT/EP2014/077150
§ 371 (c)(1),
(2) Date: Jun. 7, 2016

(87) PCT Pub. No.: WO2015/086648
PCT Pub. Date: Jun. 18, 2015

(65) Prior Publication Data
US 2016/0369923 A1   Dec. 22, 2016

(30) Foreign Application Priority Data

Dec. 10, 2013 (EP) ..................................... 13196405

(51) Int. Cl.
*F16L 37/56* (2006.01)
*F16L 37/23* (2006.01)
(Continued)

(52) U.S. Cl.
CPC ............ *F16L 37/56* (2013.01); *E02F 9/2275* (2013.01); *F16L 37/23* (2013.01); *F16L 37/34* (2013.01)

(58) Field of Classification Search
CPC ............ F16L 39/00; F16L 39/06; F16L 37/56
(Continued)

(56) References Cited

U.S. PATENT DOCUMENTS 5,507,530 A * 4/1996 Mahaney ............... E02F 3/3654
285/124.1
5,988,697 A * 11/1999 Arosio ..................... F16L 37/23
285/124.1

(Continued)

*Primary Examiner* — Aaron M Dunwoody
(74) *Attorney, Agent, or Firm* — Abelman, Frayne & Schwab

(57) ABSTRACT

The present invention relates to a multi-coupling device (1) for the multiple quick connection of multiple hydraulic, electrical and/or pneumatic lines, with the possibility of individual manual couplings. The multi-coupling device (1) comprises a first plate (2) connectable to a vehicle or apparatus and supporting a plurality of couplings (3), each of said couplings being connectable to a hydraulic line and being adapted to being connected to corresponding couplings (41) of a second multi-coupling plate (40) for the connection of said hydraulic lines with a point of use, said device (1) being characterised in that at least one of said couplings (3) of said first plate (2) comprises connecting means (32, 33, 34, 35) for connecting and firmly retaining a single coupling (80) and disconnecting means (50) that can be manually operated by the user and are adapted to interact with said connecting means (32, 33, 34, 35) to allow the release of the individual coupling. The device according to the present invention overcomes a limitation inherent to the multi-connection devices of the type known in the state of the art and consisting in that they can only be used with points of use equipped with corresponding multi-coupling (Continued)

plates thus, on the contrary, also allowing points of use equipped with individual couplings to be connected.

9 Claims, 6 Drawing Sheets

(51) Int. Cl.
*F16L 37/34* (2006.01)
*E02F 9/22* (2006.01)

(58) Field of Classification Search
USPC .................. 285/19, 20, 120.1, 124.1, 124.4
See application file for complete search history.

(56) References Cited

U.S. PATENT DOCUMENTS

| | | | | |
|---|---|---|---|---|
| 6,019,397 A * | 2/2000 | Baudu | ................ | F16L 39/00 |
| | | | | 285/124.1 |
| 7,389,794 B2 * | 6/2008 | Knuthson | ............ | F16L 37/20 |
| | | | | 137/595 |
| 7,703,812 B2 * | 4/2010 | Asam | ................ | E02F 9/2275 |
| | | | | 285/124.3 |
| 8,256,801 B2 * | 9/2012 | Hagen | ................ | F16L 5/14 |
| | | | | 285/124.1 |
| 8,991,872 B2 * | 3/2015 | Mahrenholz | ............ | F16L 39/00 |
| | | | | 285/124.3 |
| 2003/0201017 A1 * | 10/2003 | Knuthson | ............ | F16L 37/30 |
| | | | | 137/614.03 |
| 2005/0285390 A1 * | 12/2005 | Martin | ................ | F16L 37/56 |
| | | | | 285/124.5 |
| 2006/0273580 A1 * | 12/2006 | Marquis | ................ | F16L 37/32 |
| | | | | 285/124.5 |
| 2011/0198841 A1 * | 8/2011 | Kitagawa | ................ | F16L 37/32 |
| | | | | 285/314 |
| 2012/0234415 A1 * | 9/2012 | Cardi | ................ | F16L 37/56 |
| | | | | 137/614.04 |
| 2013/0134702 A1 * | 5/2013 | Boraas | ................ | F16L 37/23 |
| | | | | 285/124.1 |
| 2016/0061370 A1 * | 3/2016 | Gennasio | ............ | F16L 37/34 |
| | | | | 251/58 |
| 2016/0109044 A1 * | 4/2016 | Danelli | ................ | F16K 17/02 |
| | | | | 137/594 |
| 2016/0281895 A1 * | 9/2016 | Allevi | ................ | F16L 37/23 |
| 2016/0290543 A1 * | 10/2016 | Gatti | ................ | F16L 37/23 |
| 2017/0184239 A1 * | 6/2017 | Ferrara | ................ | F16L 37/02 |
| 2017/0202128 A1 * | 7/2017 | Emmert | ............ | A01B 59/043 |
| 2018/0128391 A1 * | 5/2018 | Ekstrom | ............ | F16K 17/0473 |

* cited by examiner

MULTI-COUPLING DEVICE FOR THE MULTIPLE QUICK COUPLING OF MULTIPLE HYDRAULIC, ELECTRICAL AND/OR PNEUMATIC LINES, WITH THE POSSIBILITY OF INDIVIDUAL MANUAL COUPLINGS

CROSS REFERENCE TO RELATED APPLICATION

This application claims benefit under 35 U.S.C. § 371 to international application No. PCT/EP2014/077150, filed on Dec. 10, 2014, which claims priority to European application no. EP13196405.8, filed Dec. 10, 2013, the contents of which are incorporated by reference in their entireties.

FIELD OF THE INVENTION

The present invention relates to a multi-coupling device of the plate variety for connecting, through quick-couplings, a plurality of hydraulic, electrical and pneumatic lines.

The need to simultaneously connect a plurality of lines, whether hydraulic, electrical and/or pneumatic, has been established for some time in various industrial sectors. Such a need is for example felt in the agricultural sector, for the connection of buckets, lifters, forks and agricultural equipment in general to be connected to a tractor for example; in the construction sector, in asphalt or cement machinery, in hydraulic hammers and the like; in the transport sector, for connecting blades, trailers and the like to a snow vehicle, and so forth.

There is thus a specific need to be able to connect multiple hydraulic, electrical and pneumatic lines, saving time, avoiding fluid losses or air inclusions in the lines during the connection and disconnection steps, and preventing dangerous connection errors such as the inversion of two lines, for example.

STATE OF THE ART

These needs are met by certain technical solutions, the most well-known and functional being constituted by a multi-coupling plate known on the market under the trade name Multifaster and already in certain aspects object of Italian patent IT1271165 and in other aspects, of European patent EP 0 787 905 B1 and EP0 522 493 B2, owned by the same applicant, comprising two connecting plates, one of which is connected to an auxiliary device to be connected, and is therefore movable, while the other is in general connected to the vehicle or to the apparatus to which said auxiliary device is to be connected, and is therefore fixed.

Each of the two plates thus houses a plurality of quick-coupling connectors. In particular, the fixed plate is preferably equipped with couplings having a flat female part, while the moveable plate is equipped with corresponding couplings having a flat male part. One to twelve lines, selected from hydraulic, electric and pneumatic lines, are simultaneously present on said plates. In general, each point of use has one forward and one return line, so that two pairs of couplings are necessary for each point of use.

In particular, the fixed plate, i.e. the one connected to the vehicle or to the energy source machine and/or pressurised fluids, was the subject of particular design focus as its surface was made completely flat, so as to allow easy and quick cleaning thereof.

The connecting plate of the auxiliary device, the movable one, generally has construction elements such as guide pins, couplings for connecting hydraulic pipes and electrical connectors, which are positioned so as to protrude from the lower surface of the movable connecting plate, while the fixed connecting plate mounted onto the vehicle or onto the apparatus as described, is provided with holes and slots for introducing said pins and couplings, and with electrical connectors, housed within the body of the fixed plate, which thus has a smooth and flat surface. The surface of the flat plate can thus be easily cleaned at the time of connection of the movable plate of the auxiliary device, it also being possible to suitably close the fixed plate by means of a protective cover that prevents fouling of the plate and of the female connectors during the period of non-use.

As regards the connection and disconnection of the movable plate to/from the fixed plate, this takes place thanks to a handle or locking lever, easily gripped by the operator, which is oscillatable around a fulcrum that is integral with the main body to which the fixed plate is connected. Said lever is generally shaped like a handle and is hinged on two sides of the fixed plate, each of the two sections of the handle hinged with said plate has an guide or eccentric groove to eccentric capable of housing suitable pins provided on the movable plate, so that the action of said eccentric groove or cam on the pins brings the movable plate closer to the fixed plate facilitating the correct insertion of the connectors and maintaining the two plates firmly connected throughout the period of operation, during which said lever is locked in the down position.

There is a wide mix, in terms of dimensions the number of lines, of these types of plates currently available on the market. Thanks to this solution, multiple hydraulic lines can be connected in an individual step without danger of inverting them.

There is also, nevertheless, a need to be able to connect individual couplings that are not supported by a movable backplane plate to the couplings supported by the fixed plate machine side. There may, for example, be a need for this requirement in the case in which the user does not, for economic reasons, wish to have a movable multi-coupling plate, an point of use. Even if the user will be exposed to the risk of inverting the lines with the manual couplings, and will therefore have to pay special attention in connection operations, the saving is substantial especially in the case of points of use that do not require more than two hydraulic lines for operation. In these cases, the possibility of being able to engage individual connectors on a fixed, multi-coupling plate is currently precluded with the solutions of the known type, as a movable, multi-coupling plate can only be connected to a fixed, multi-coupling plate.

SUMMARY OF THE INVENTION

The device according to the present invention therefore comprises a multi-coupling plate intended to be fixedly connected to a machine.

The main aim of the present invention is thus that of eliminating the above-cited drawbacks.

In the context of this aim, the object of the present invention is thus to provide a multi-coupling plate connecting device that comprises one or more individual couplings on which corresponding individual couplings not associated with a multi-coupling plate can be individually engaged.

This aim and these and other objects that will become clearer below are achieved by a multi-coupling device comprising a main body that is connectable to a vehicle or apparatus and supporting a first plate comprising a plurality of couplings, each connected to a hydraulic line and adapted to being connected to corresponding connectors of a second multi-coupling plate for the connection of said hydraulic lines with a user, said device being characterised in that at least one of said plurality of couplings of said first plate comprises connecting means for connecting and firmly retaining an individual coupling, and in that on said first plate there are also provided disconnecting means that are opera table by the user and are adapted to interact with said connecting means to allow release of the individual coupling.

The device according to the present invention is further characterised in that said at least one individual coupling further comprises disconnecting means to allow the release, or the disconnection of the individual male coupling from the individual female coupling.

The device according to the present invention is further characterised in that said first plate comprises, at its upper surface from which the plurality of couplings protrude, and at each of said individual couplings, a suitably-obtained slot intended to house said disconnecting means.

DESCRIPTION OF THE DRAWINGS

Further characteristics and advantages of the present invention shall become clearer from the following detailed description, provided by way of a non-limiting example and illustrated in the accompanying drawings, wherein.

DETAILED DESCRIPTION OF THE INVENTION

Figure 1:
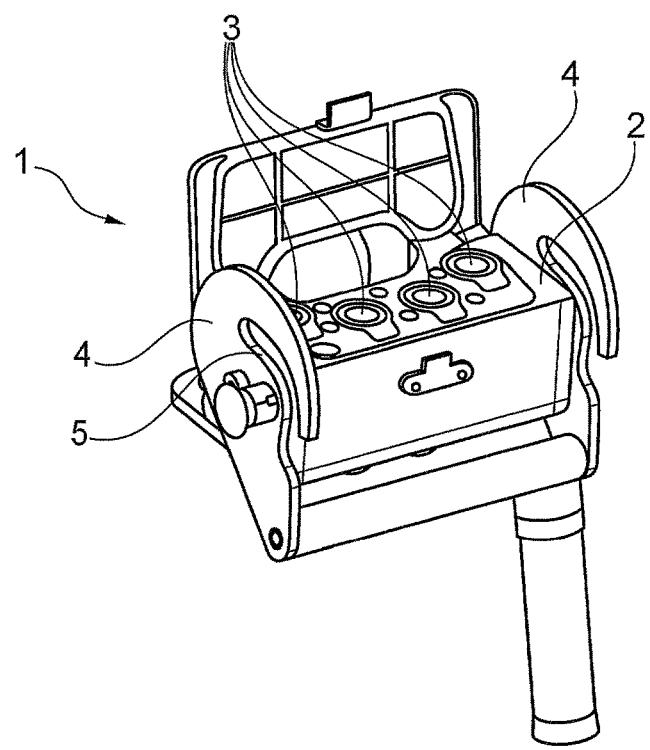
FIG. 1 shows a perspective assembly view of the multi-coupling device according to the present invention.
Figure 2:
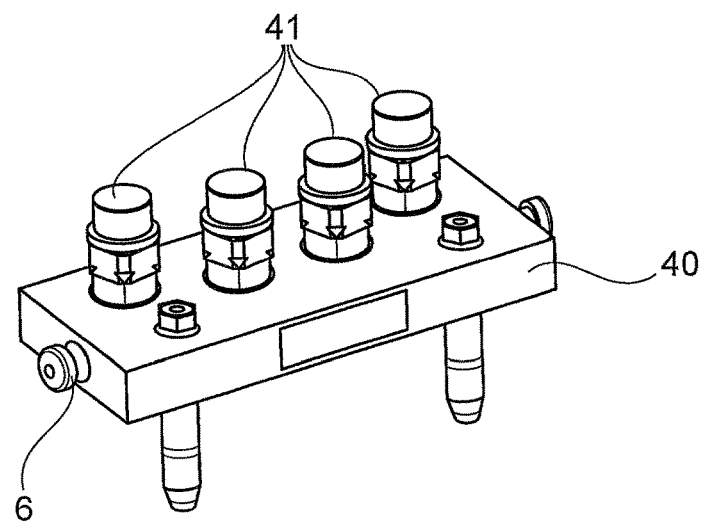
FIG. 2 shows a perspective assembly view of one example of second movable plate of a type known in the prior art and adapted to be coupled to the first fixed plate of the device according to the present invention of FIG. 1.
Figure 3:
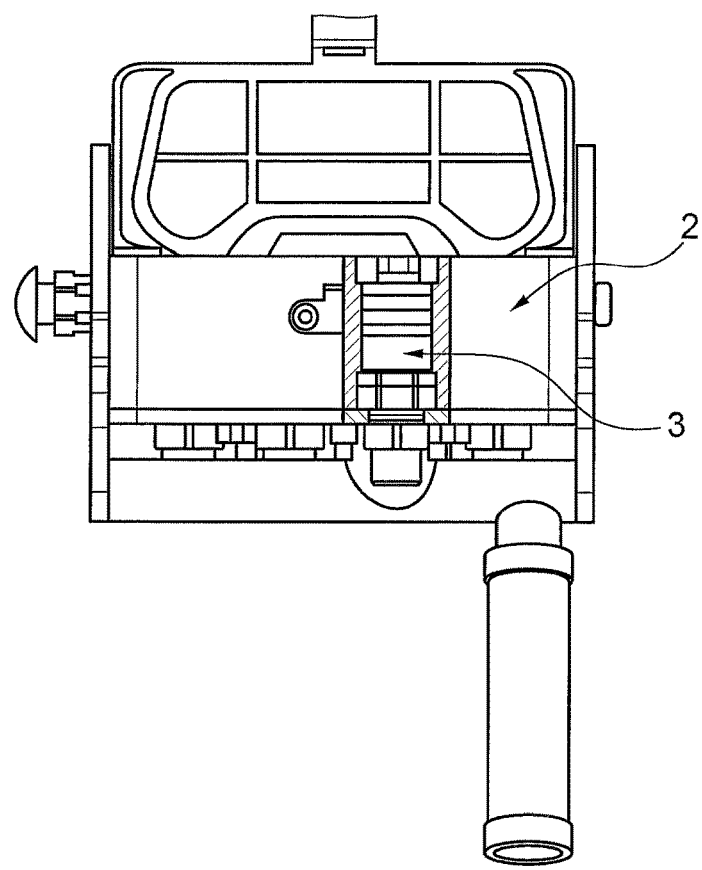
FIGS. 3 and 4 show a front view of the same details of FIGS. 1 and 2, in which further details can be seen.
Figure 4:
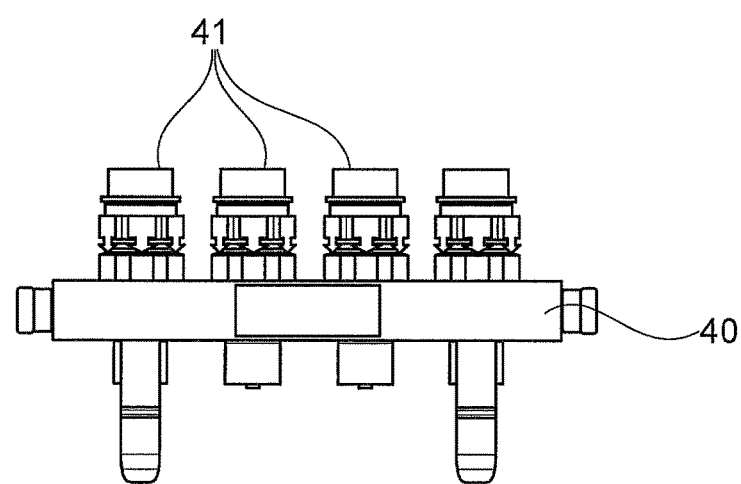

According to a preferred embodiment of the present invention illustrated in the cited drawings by way of a non-limiting example, the multi-coupling device 1 according to the present invention comprises a first plate 2, which in turn supports a plurality of couplings 3, preferably female couplings. According to what is known in the state of the art, a second plate 40, which also supports a plurality of couplings 41, in this case male couplings, can be coupled to the first plate 2, so that the couplings supported by the two plates are able to accomplish the connection of as many hydraulic lines.

The first plate 2 of said device is fixedly connectable to a vehicle or apparatus, and the second movable plate is generally connected to a point of use to be connected to this vehicle or apparatus. The multi-coupling device 1 according to the present invention advantageously further comprises a handle not shown in the accompanying figures, pivoted at both sides of the plate 2. In more detail, said handle connects to said plate 2 by means of a pair of cams 4 that are hinge at each side of said main body and on which an eccentric groove 5 is obtained. Each of said eccentric grooves 5 is responsible, during the coupling step of the fixed plate 2 with said second movable plate, to accommodating a pin 6 provided on said second movable plate, and has a shape due to which once the pins of the second plate have been positioned between the eccentric grooves 5 of the plates 4, when the operator lowers the lever, there is obtained the mutual approach and the closure of the two plates against each other, and thus the connection of the male couplings within the corresponding couplings of the first plate.

Once again with reference to the drawings, with particular reference to drawings 3 and 4, the device according to the present invention comprises in said first plate 2 couplings 3 equipped with suitable connecting means necessary for allowing coupling with individual couplings. In particular, according to the preferred embodiment of the present invention illustrated herein by way of example, the couplings 3 of said first fixed plate 2 are flat-faced female couplings, while the individual couplings with which the coupling is to take place are male coupling are male ISO couplings that are compliant with the ISO 16028 standard.

Figure 5:
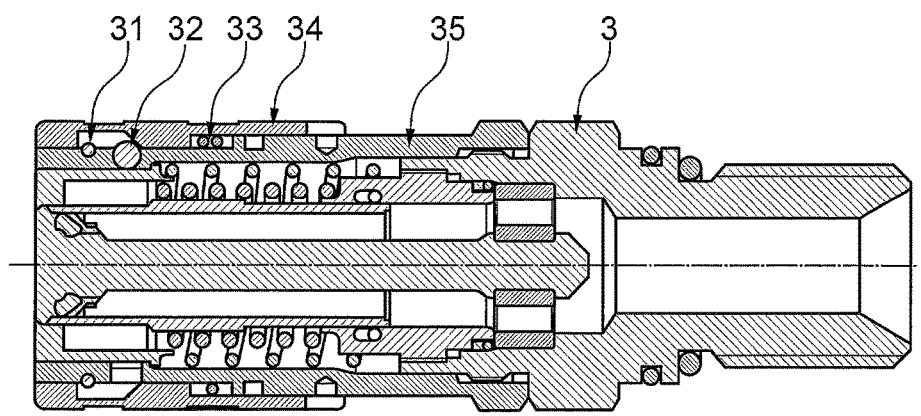
FIG. 5 shows a cross-section view of a female coupling of the individual type comprised in the fixed plate of the device according to the present invention.

With particular reference to FIG. 5, the female couplings 3 of the device according to the present invention comprise a hollow, cylindrical ball housing 35 in which are obtained a series of radial holes wherein the balls 32 are assembled. A ring 34, also having cylindrical symmetry, which is pushed by a spring 33 that acts between said ring 34 and the ball housing 35 is further provided outside the ball housing 35.

The balls 32 are movable in a radial direction between a first expanded position in which they are at least partially contained within a suitable slot obtained on the inner surface of an outer ring 34, and a second, sunken position.

The ball housing 35, the balls 32, the ring 34 with the spring 33, which allows the movement thereof, are part of the connecting means that allows the female coupling on the fixed plate to be connected and firmly held in an individual male coupling that is not mounted on a movable back plate 40 of the type employed in the state of the art of multi-coupling connections.

The snap ring 31, positioned at the front portion of the outer surface of the ball housing 35 is also present to ensure retention.

Figure 6:
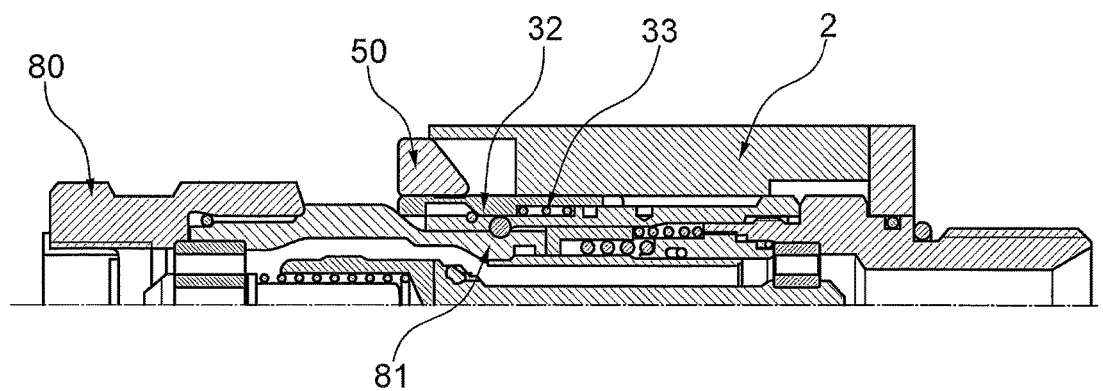
FIG. 6 shows a cross-section view of the female coupling of FIG. 5 connected to an individual male coupling.
Figure 7:
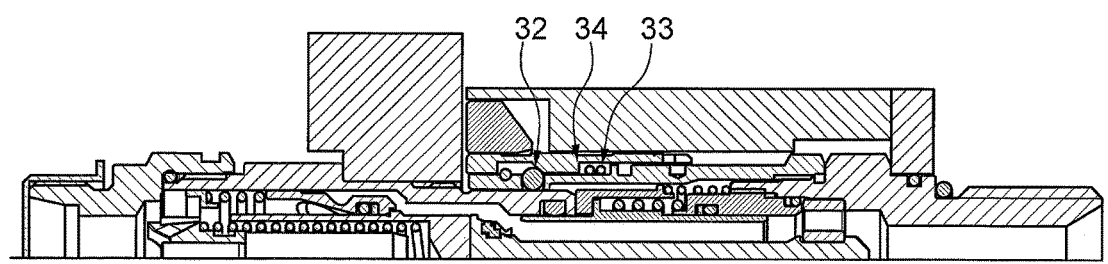
FIG. 7 shows a cross-section view of the female coupling of FIG. 5 connected to a male coupling mounted on a movable plate.
Figure 8:
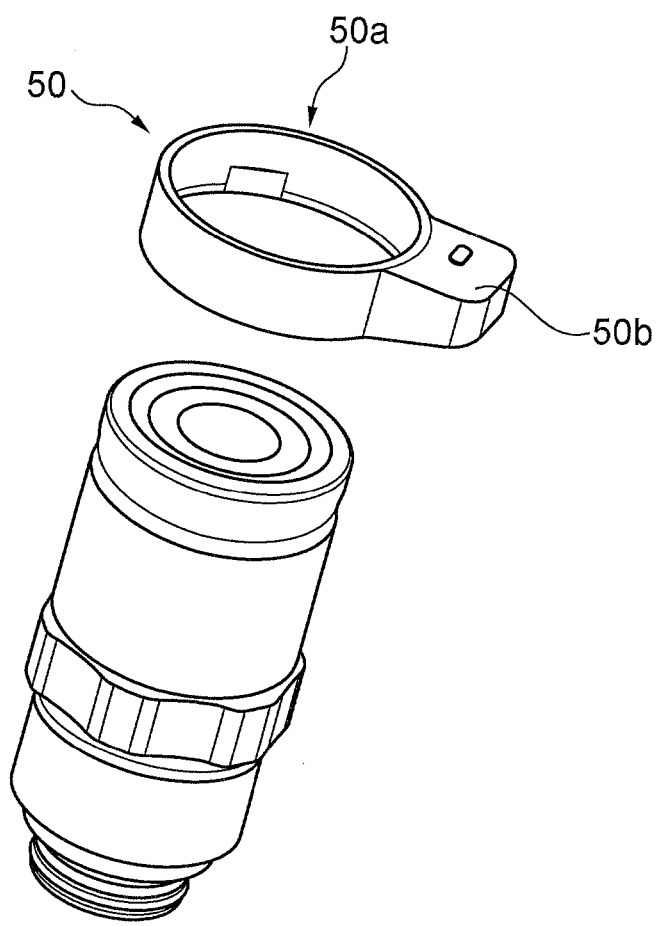
FIG. 8 shows a perspective view of a flat female face of the type employed in the first fixed plate of the device according to the present invention to allow coupling of the individual couplings and the disconnecting means, constituted in this example by a ring-shaped button.
Figure 9:
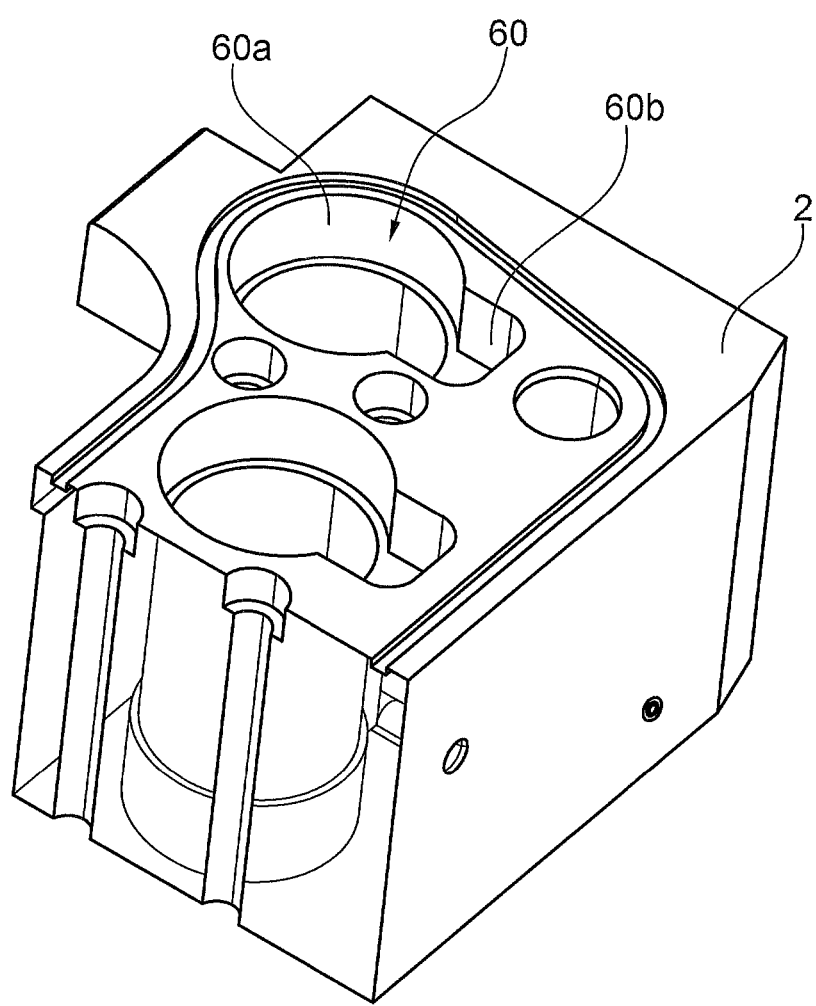
FIG. 9 shows a perspective view of a detail of the slots suitably obtained on said first plate of said multi-connection device to allow said disconnecting means to be housed, said slots being obtained at the couplings of the first plate.

FIG. 6 shows a female coupling 3 according to the present invention, connected with an individual male coupling 80 that is compliant with standard ISO 16028. An external cavity 81 is present in the male into which the balls 32 of the male coupling are inserted. The ring 34 springs forward by effect of the thrust of the spring 33 and the male coupling remains locked in the female coupling.

At this point another technical problem however arises, linked to the fact that the female coupling of the present invention is, as said, inserted in said first plate 2 with respect to the surface of which the female coupling must not protrude to allow coupling with the second movable plate.

It is not therefore possible to manually intervene on the ring of the female coupling since this is inaccessible by the user, being surrounded by the fixed plate 2, therefore, the multi-coupling device 1 according to the present invention further comprises specially devised disconnecting means at each of the female couplings arranged to be able to engage individual male couplings.

Said disconnecting means 50 comprise a pusher that is integral with the ring 34. The pusher 50 comprises a first ring-shaped portion 50a from which a flat portion 50b adapted to being pressed by the user, firmly extends in a radial direction.

Manually pressing the flat portion 50b of the pusher 50 towards the inside of the plate, causes the ring 34 to move backward towards the inside of said plate, and the balls 32 shift radially to be housed in the slot especially provided on the inner surface of the ring 34 itself, thus freeing the male coupling, which automatically disconnects thanks to the springs that are present in both parts.

In the multi-connection systems of the type known in the state of the art, the male couplings supported by the second movable plate are not equipped with an external slot adapted to house the balls 32 of the female coupling; the balls thus 32 remain in the expanded position preventing advancement of the ring 34, thus the device according to the present invention is suitably designed to be able to engage both couplings assembled on a movable plate and individual couplings of standard type.

The technical problem linked to the impossibility of operating the ring 34 of the female coupling so as to be able to disengage the female coupling has again been resolved, as previously mentioned, by means of the use of a pusher 50, that is suitably ring-shaped so as to slide over the female coupling while making the ring itself move back.

In the fixed plate 2 there is therefore suitably provided, at each female coupling adapted to engage individual male couplings, a housing slot 60 of the pusher 50 that is suitably shaped on the plane defined by the plate 2 to house said pusher 50. Each of said slots 60, will thus suitably comprise a first substantially circular portion 60a adapted to housing the ring-shaped portion 50a and a second portion 60b adapted to house the flat portion 50b that radially extends from said ring-shaped portion 50a.

As will be better understood from what can be seen in the accompanying drawings, each of said housing slots 60 of the pusher 50, shall have a depth that is sufficient, along the axial direction of the coupling 3, to allow movement of the pusher for a stroke sufficient for complete withdrawal of the ring 34.

The multi-coupling device according to the present invention thus allows the operator to connect/disconnect both a movable plate supporting a plurality of male couplings of a multi-connection plate, and one or more individual male couplings of the ISO 16028 type, to/from the female couplings of a plate multi-coupling connection.

The multi-coupling device according to the present invention is thus more versatile with respect to the multi-coupling devices of the type known in the state of the art, being usable both with points of use in turn equipped with multi-coupling plates and with points of use equipped with individual couplings.

The scope of protection of the accompanying claims must not be restricted by the illustrations or by the preferred embodiments provided by way of example in the description; the claims must instead include all the characteristics of patentable novelty arising from the present invention, including all the characteristics that would be deemed equivalent by a person skilled in the art.

The invention claimed is:

1. A multi-coupling device comprising: a first plate connectable to a vehicle or apparatus and supporting a plurality of first couplings, each of said couplings being connectable to a hydraulic line and being configured for connection to a corresponding plurality of second couplings of a second multi-coupling plate for the connection of said hydraulic lines with a point of use; wherein at least one of said plurality of first couplings of said first plate is configured to be individually engagable with and further comprises connecting means for connecting and firmly retaining a third coupling which is unassociated with the second couplings of the second plate, and disconnecting means that can be manually operated by the user and is configured to interact with said connecting means to allow a release of the third coupling from the at least one individually engagable first coupling; wherein said connecting means of said at least one individually engagable first coupling comprises a hollow cylindrical ball housing, a plurality of balls that are mobile in a radial direction between a first expanded position and a second retracted position, an outer cylindrical ring configured to slide longitudinally along said ball housing, said outer cylindrical ring being maintained in a most forward position corresponding to a condition wherein the balls are in retracted position by operation of a spring that acts between said ball housing and said outer cylindrical ring; and wherein said disconnecting means includes on said first plate, at each of said first couplings configured to be individually engagable, a housing slot configured to receive a pusher, said pusher being attached to said outer cylindrical ring and including a first ring-shaped portion having a flat portion extending radially outwardly and configured to be pressed by the user to slidably move the outer cylindrical ring therein and release an inserted third coupling from a corresponding one of the at least one individually engagable first couplings.

2. The multi-coupling device according to claim 1, wherein said first couplings of said first plate are female couplings, and said second and third couplings are male couplings.

3. The multi-coupling device according to claim 1, wherein said housing slot of the pusher in turn comprises a first substantially circular portion configured to house the ring-shaped portion of said pusher and a second portion configured to house the flat portion of said pusher that radially extends from said ring-shaped portion.

4. The multi-coupling device according to claim 2, wherein said housing slot of the pusher in turn comprises a first substantially circular portion configured to house the ring-shaped portion of said pusher and a second portion configured to house the flat portion of said pusher that extends radially from said ring-shaped portion.

5. The multi-coupling device according to claim 1, wherein said housing slot of the pusher has a depth along an axial direction of the coupling that is sufficient to allow the movement of the pusher for a stroke corresponding to the complete withdrawal of the outer cylindrical ring.

6. The multi-coupling device according to claim 2, wherein said housing slot of the pusher has a depth along an axial direction of the coupling that is sufficient to allow the movement of the pusher for a stroke corresponding to the complete withdrawal of the outer cylindrical ring.

7. The multi-coupling device according to claim 3, wherein said housing slot of the pusher has a depth along an axial direction of the coupling that is sufficient to allow the movement of the pusher for a stroke corresponding to the complete withdrawal of the outer cylindrical ring.

8. The multi-coupling device according to claim 4, wherein said housing slot of the pusher has a depth along an axial direction of the coupling that is sufficient to allow the movement of the pusher for a stroke corresponding to the complete withdrawal of the outer cylindrical ring.

9. The multi-coupling device according to claim 1 further comprising a handle assembly for aligning and releasably securing the second plate to the first plate.

* * * * *